(12) United States Patent  
Ishii et al.

(10) Patent No.: US 7,483,362 B2  
(45) Date of Patent: Jan. 27, 2009

(54) RECORDING/REPRODUCING APPARATUS

(75) Inventors: Mieko Ishii, Tsuchiura (JP); Takeshi Harada, Abiko (JP)

(73) Assignee: Hitachi, Ltd., Tokyo (JP)

( * ) Notice: Subject to any disclaimer, the term of this patent is extended or adjusted under 35 U.S.C. 154(b) by 671 days.

(21) Appl. No.: 11/192,396

(22) Filed: Jul. 29, 2005

(65) Prior Publication Data

US 2006/0092811 A1    May 4, 2006

(30) Foreign Application Priority Data

Nov. 1, 2004    (JP) .............................. 2004-317454

(51) Int. Cl.
    *G11B 9/00* (2006.01)
(52) U.S. Cl. .................................................. 369/126
(58) Field of Classification Search ................ 369/126
    See application file for complete search history.

(56) References Cited

U.S. PATENT DOCUMENTS

| 5,202,879 | A | * | 4/1993 | Oguchi et al. .............. 369/126 |
| 5,418,771 | A | * | 5/1995 | Kasanuki et al. ............ 250/307 |
| 5,526,334 | A | * | 6/1996 | Yamano et al. ............. 369/126 |
| 5,546,375 | A | * | 8/1996 | Shimada et al. ............ 369/126 |
| 5,831,961 | A | * | 11/1998 | Sakai et al. ................. 369/126 |
| 7,042,669 | B2 | * | 5/2006 | Ogawa et al. ................. 360/55 |
| 7,239,544 | B2 | * | 7/2007 | Chen et al. .................. 365/163 |
| 7,382,712 | B2 | * | 6/2008 | Cherubini et al. .......... 369/126 |
| 7,403,467 | B2 | * | 7/2008 | Albrecht et al. ............ 369/126 |
| 2002/0080710 | A1 | * | 6/2002 | Kim et al. .................. 369/126 |

FOREIGN PATENT DOCUMENTS

| JP | 06-012710 | 1/1994 |
| JP | 08-115600 | 5/1996 |
| JP | 2000-113532 A | 4/2000 |

* cited by examiner

*Primary Examiner*—Thang V Tran  
(74) *Attorney, Agent, or Firm*—McDermott Will & Emery LLP

(57) ABSTRACT

In a recording/reproducing apparatus having a large number of probes, being still usable continuously when several pieces of the probes are in trouble, wherein a plural number of probes are so disposed that they can make recording and/or reproducing onto the same recording area, which is in charge of the probes, respectively, and when defect, such as, a trouble is generated within a first probe, that defect is detected, automatically, so as to exchanged into a spare probe built within the frame, thereby compensating the defect.

3 Claims, 14 Drawing Sheets

PRESENT EMBODIMENT

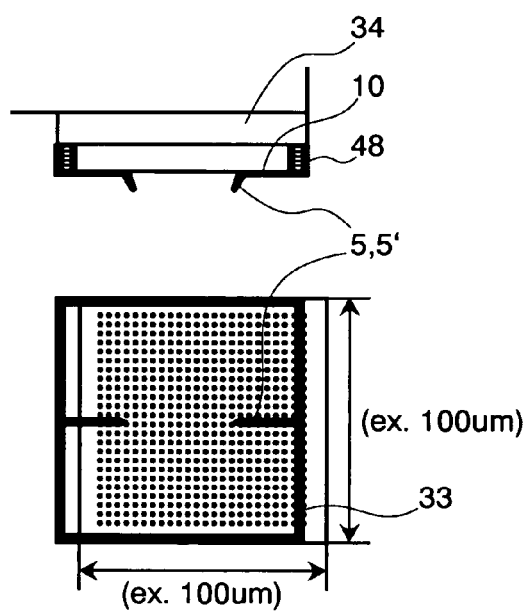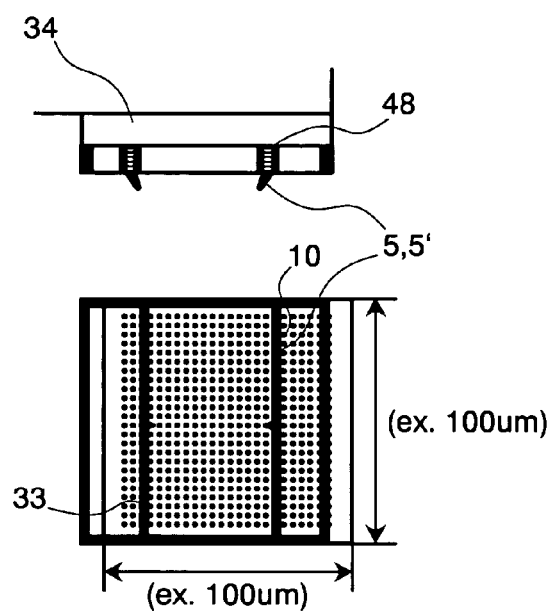

(STROKE IS LARGE)

(STROKE IS SMALL)

RECORDING/REPRODUCING APPARATUS

BACKGROUND OF THE INVENTION

The present invention relates to a recording/reproducing apparatus for conducting recording or reproducing, in particular it relates to that enabling to record a large amount or volume of data information, etc., at super-high density.

Developments are made on a scanning-type tunnel microscope (hereinafter, "STM") and/or an atomic force microscope (hereinafter, "AFM"), having spatial resolution of level of atoms and molecules, and they are applied in various analyses on fine structures; i.e., being utilized widely as a surface analyzing apparatus. In particular, the AFM is developed to be a scanning-type probe microscope (hereinafter, "SPM"), using various kinds of physical quantities as a probe, in recent years, and lately, various studies are made upon the possibility of realization of a recording/reproducing apparatus with using those means; i.e., as a means for accessing to atoms and molecules.

The recording/reproducing apparatus with applying the probe of scanning-type, which is used in the AFM, is described in the following Patent Documents 1 and 2. In those, there is described an apparatus of causing changes in characteristics within a very fine or microscopic area on the recording medium, through application of desired voltage on a prove, while driving a large number of probes at the same time, thereby conducting the recording and the reproducing. Each of the large number of probes has an area in charge thereof, being called by a "frame", respectively, and also carries out the recording and the reproducing within the area in charge thereof. And, for the time when a part of the probes is broken, in those patent documents, there is provided a means for exchanging a probe unit, on which the probes are provided in a large number thereof, or the recording medium.

Further, in the following Patent Document 3 is shown the structure of the recording/reproducing apparatus, in which the probes are aligned into a radial direction, opposing to a rotation-type recording medium, while providing a moving mechanism for moving them into the radial direction, opposing to the rotation-type recording medium (see FIG. 15).

Patent Document 1: Japanese Patent Laying-Open No. Hei 6-12710 (1994);

Patent Document 2: Japanese Patent Laying-Open No. 2000-113532 (2000); and

Patent Document 3: Japanese Patent Laying-Open No. Hei 7-93833 (1995).

Thus, in the Patent Documents 1 and 2, in the case when some of the probes are broken, an entire of the probe units are exchanged, irrespective of that there still remain a large number of normal probes.

BRIEF SUMMARY OF THE INVENTION

An object is, according to the present invention, for dissolving such the drawbacks mentioned above, to provide a recording/reproducing apparatus, having high reliability.

Such the drawbacks as was mentioned are dissolved, within a recording/reproducing apparatus, for recording and/or reproducing information onto a recoding medium by means of a large number of scanner-type probes, wherein the probes are so disposed, that a plural number of the probes are able to make recording or reproducing onto the same recording area on the recording medium, which is in charge of the probes, respectively, a confirmation is made on whether a single number of the probes is able to R/W, always, thereby to store the said probe into the frame, electrically or mechanically, if it is unable to R/W, and thereafter, conduction of electricity is made by exchanging wiring into other (i.e., a spare) probe, which is provided within the same frame, thereby to release that new probe, electrically and mechanically, to be in the condition of being able to R/W, and thereafter, checking is made on whether it is able to R/W through conducting a signal thereto, then if being able to R/W, it is returned into the condition of being able R/W operation in the place of the probe of being unable to R/W. At the same time, the probe of being unable to R/W mentioned above is so controlled that it does not disturb or obstacle the moving operation and the R/W operation of the new one.

Thus, according to the present invention, R/W can be continued with using other probe even when generating damage and/or abrasion in the probe, and therefore it is possible to improve the reliability of the apparatus, but without bringing about a load, such as, exchange thereof, etc., on a user. At the same time, it is also possible to obtain a long lifetime of the apparatus, as a whole, and to rise up the reliability of the apparatus.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 4 is an enlarged view of the probe and the frame, according to the present invention;

DETAILED DESCRIPTION OF THE INVENTION

Hereinafter, embodiments according to the present invention will be fully explained by referring to the attached drawings.

Figure 3:
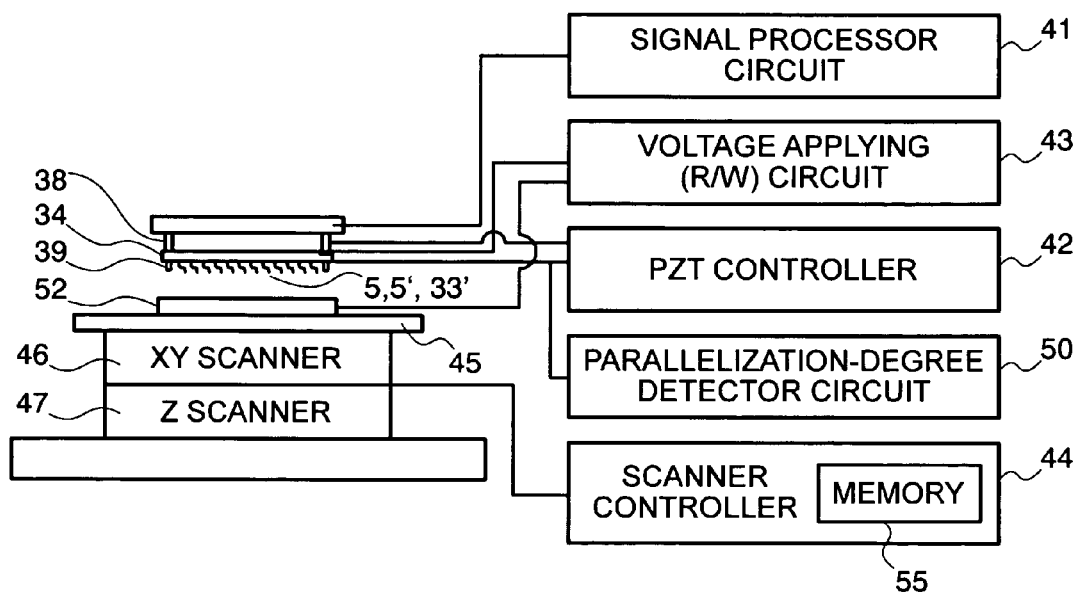
FIG. 3 is a configuration view of the recording/reproducing apparatus, according to the present invention.

The recording/reproducing apparatus, shown as an embodiment of the present invention, applies therein the structure of the AFM. FIG. 3 is a view for showing the fundamental structure of one embodiment, according to the present invention.

The recording/reproducing apparatus, shown as the one embodiment of the present invention, has the structure of recording information by causing electrical or physical changes within a predetermined area on a recording medium while reading out information by measuring electrical changes within the predetermined area on the medium, with using the same probe.

The probes disposed in a large number thereof, as were mentioned above, as well as, cantilevers, they are called by a "multi-probe", and each of those probes is in charge of a certain recording area of a specific area (for example, 100 μm squares) by one piece thereof, wherein each of those probes is supported by a frame 33, which builds up a multi-probe supporting body (hereinafter, being called by a "frame assembly 33'"), whereby the recording/writing (R/R) can be made to/from a desired recording area, through either one of the movement of the frame assembly 33' or the movement into X and Y directions of a driving apparatus provided on a side of the medium. Herein, the frame 33 means an area, on which the probe provided within the said frame is in charge of recording or reproducing, and in the present embodiment. It has a framework structure having a size same to that of the area in charge thereof. Also, each of the framework structures builds up a supporting body for supporting the proved within the said framework.

In FIGS. 1 (a) and 1(b) are shown an explanatory view of the embodiment according to the present invention.

Figure 1A:
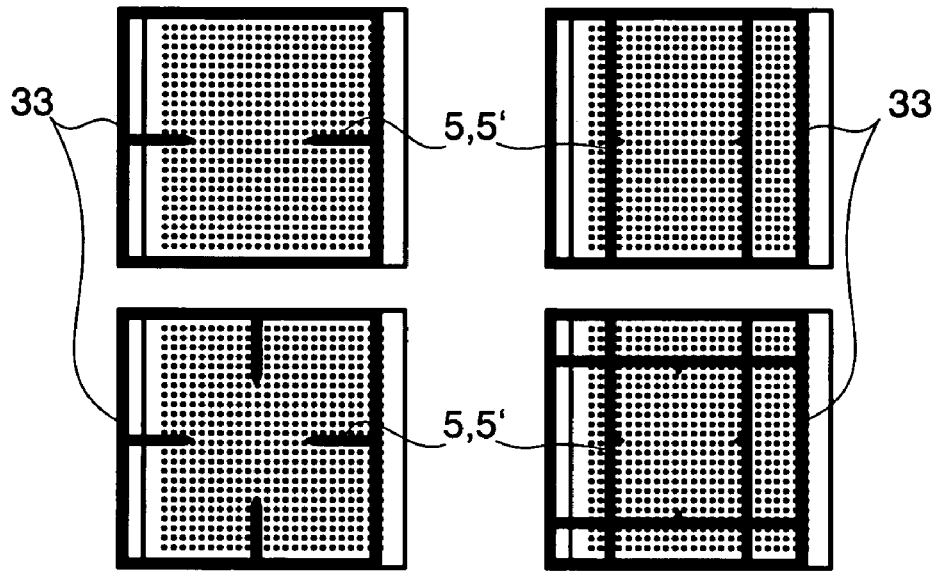
FIGS. 1(a) and 1(b) are explanatory views for showing principle portions of the conventional art and an embodiment of the present invention.
Figure 1B:
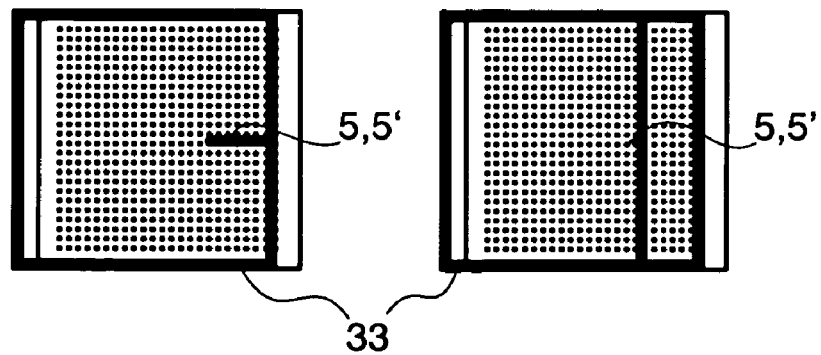

In FIGS. 1(a) and 1(b), there is shown the embodiment according to the present invention, in which a plural number of probes 5 and 5' are provided for each of the frames 33 (in FIG. 1(a)), and the conventional example, in which a single number of the probe 5 is provided for each thereof (in FIG. 1(b)).

In the conventional example shown in FIG. 1(b), a probe is formed only by one (1) piece within each of the recording areas, wherein each the probe conducts R/W within the area in charge thereof. On the other hand, according to the embodiment shown in FIG. 1(a) of the present invention, within each of the frames 33 are provided probes 5 and 5' in plural numbers thereof. Because of provision of the plural numbers of probes 5 and 5' within each of the frames 33, in this manner, even if a first one of the probes is broken or in trouble, a probe of other spares can be substituted for it, soon; therefore, the R/W of information can be conducted, continuously, within each of the areas in charge. Accordingly, for the recording/reproducing apparatus, it is possible to keep the operation thereof, without troubles, thereby obtaining a long lifetime, as well as, increasing reliability as being such the apparatus.

Each of the probes 5 and 5' is formed on each of the frames 33, corresponding to the respective memory areas mentioned above, as is shown in FIG. 2, and the frames 33 build up the frame assembly 33' corresponding to an entire of the medium.

Figure 2:
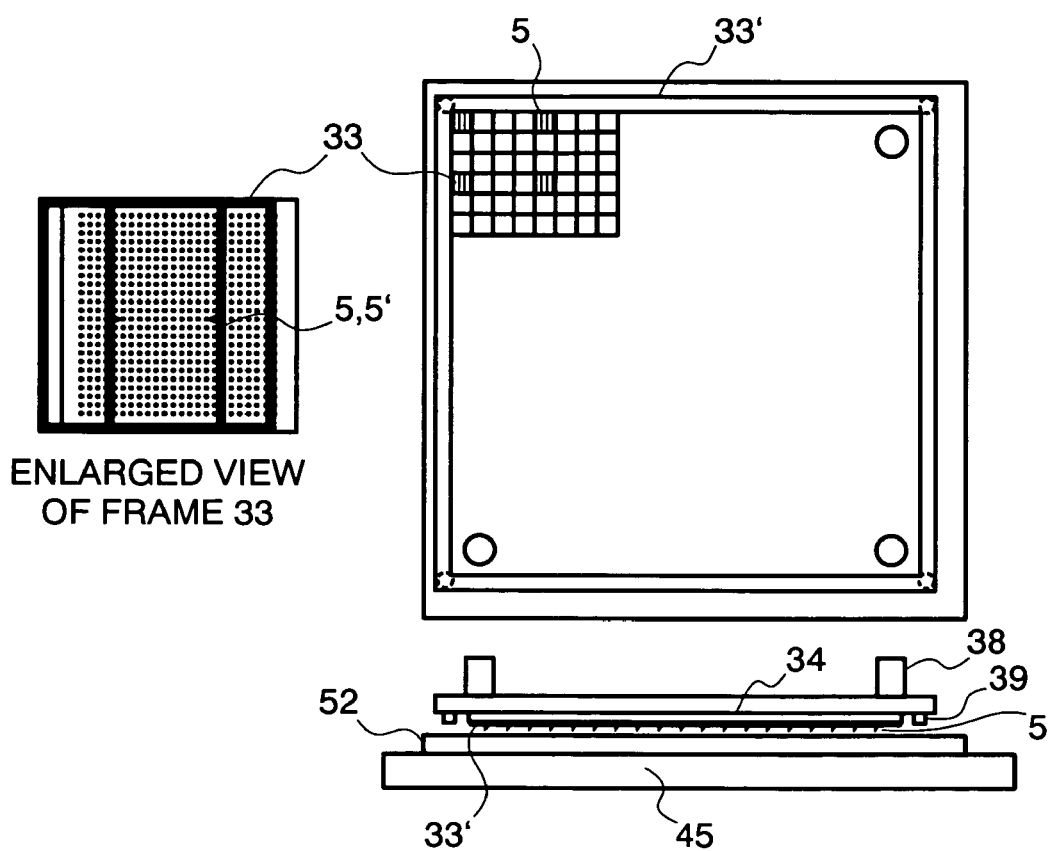
FIG. 2 is an explanatory view for showing the structures of probes, a frame assembly and a recording medium, according to the present invention.

FIG. 2 is a view of the frame assembly 33' constructed with the respective frames 33 and the medium 52, seeing from an upper portion and a side surface thereof. From the structure shown in FIG. 2, each of the probes 5 and 5' is supported by each of the frames 33, and the frames 33 build up the frame assembly 33'. The frame assembly 33' is supported by means of a frame-supporting portion 34, and further the frame-supporting portion 34 is controlled by means of PZTs 38, which are located at every (i.e., four (4)) corners of an upper portion thereof, so that it can be located in parallel to the medium 52.

FIG. 3 shows the structure of an entire of the apparatus, including therein the frame assembly 33' and the medium 52 shown in FIG. 2. In a lower portion of a stage 45, on which the medium is fixed, there are disposed an XY scanner 46 and a Z scanner 47, so that the medium 52 can be moved horizontally by means of the XY scanner 46 while vertically by means of the Z-axis scanner 47 in the structure thereof. For the XY scanner 46 and the scanner 47 of Z direction, in order to achieve the positioning at high accuracy, there is provided a scanner controller (i.e., a positioning driver control circuit) 44 for driving them into the respective directions at high accuracy. The XY scanner 46 and the Z scanner 47 are able to conduct the same functions if they are built up on the upper portion of the frame-supporting portion 34. However, from a viewpoint of wiring to the probes 5 and 5' and so on, actually it is more preferable that they are built up on a lower side of a fixing side of the medium 52.

By referring to FIG. 3, explanation will be made on the more detailed operation thereof. The frame assembly 33', being positioned in parallel to the surface of the medium 52, as was mentioned above, is equipped with sensors at every (i.e., four (4)) corners, on an opposite surface to the surface of the medium 52, each of which changes the capacity thereof depending upon a distance between the medium 52 and the frame assembly 33'. As such the sensor may be applied the conventional ones, such as, an eddy current type and/or the capacitor type, or a microscopic displacement sensor (a digital sensor) of frequency/digital conversion method, etc. The digital sensor mentioned above is a displacement sensor, applying an electrostatic coupling between an inductance and a distributed capacitor of a coil, and it is able to obtain high resolution at the "nm" level through high-frequency oscillation of several hundreds MHz. There are provided the sensors 39, being suitable one for the present apparatus among those sensors indicated in the above, and in such the structure, a degree of parallelization between the surface of the medium 52 and the frame assembly 33' is controlled, by letting the PZTs 38 provided on the upper portion of the frame supporting portion 34 to cause the displacement, respectively, so that the capacitor comes to be coincident with, at least three (3) portions among of those.

The degree of parallelization between the surface of the medium 52 and the frame assembly 33' is always checked through the sensors 39 and a parallelization-degree detector circuit 50, and signals are provided by the PZT controller 42 to the PZTs 38 on the upper portion of the frame supporting portion 34; thereby keeping the degree of parallelization to be equal or less than a certain value. Further, within an inside of the frame 33 where the probes 5 and 5' are located, the positioning drive mechanisms in the Z-direction, such as, the PZTs 48, etc., are built in, being formed into a thin-film, as is shown by the probes 5 and 5' of cantilever-type in FIG. 4(a), and the probes 5 and 5' of double-sided beam-type in FIG.

4(*b*); therefore, it is possible to perform a fine or microscopic position control through application of a desired voltage thereacross.

Also, for each of the probes 5 and 5' is provided a voltage applying (R/W) circuit 43 for conducting the recording/reproducing of information by applying voltage thereacross or by supplying current thereinto, and also a signal processor circuit 41 for processing the read-out information as a signal; i.e., being able to conduct the signal processing of a large capacity at high speed. Those circuits are formed to be a circuit element when being installed in a product.

As the operations when conducting R/W, an electric filed or voltage is applied between the probe 5 or 5' and the medium 52 by means of the voltage applying circuit 43, the signals are sent from the scanner controller (i.e., the positioning driver control circuit) 44 to the XY scanner 46 and the Z scanner 47, so that the distance between tips of the probes 5 and 5' and medium 52 comes to be a desired value with using a position detection signal, etc., such as, tunnel current or the like, for example. Further, the distance in the vertical direction is controlled with using the PZTs 38, which are buried in the upper portion of the frame assembly 33'. After obtaining the desired distance, the information is recorded on or deleted from the medium 52 through applying the electric field or voltage for use of R/W, again, by means of the voltage applying (R/W) circuit 43. When reproducing, applying the electric field or voltage, again, the information is read out through current changes, etc. All of those signals are transmitted through the wirings formed on the upper portion of the frame assembly 33', which is provided above of the probes 5 and 5'.

In the embodiment shown in FIGS. 2 and 3, the medium 52 as a whole is 3.2 mm squares in an area thereof. In an example of the conventional art, an area, 100×100 μm squares on the medium 52, is in charge of only one (1) piece of the prove 5, exclusively, when conducting R/W. The medium 52 is moved over the area (100×100 μm squares) corresponding to that in charge of the one (1) piece of the prove 5, in the XY directions by means of the XY scanner 46 and in the Z direction by means of the Z-axis scanner 47, which are provided below the medium 52, and in such the structure, the data at the desired position can be R/W through the probe 5. Since all of the data within each area can be R/W through moving into the XY directions by 100 μm, respectively, therefore it is possible for all of the probes 5 to R/W the whole data on the surface of the medium.

Also, in the example of the conventional art, the probe 5 is provided by one (1) piece for each frame 33, corresponding to the each area in charge thereof, which is shown in FIG. 2. Each frame 33 is constructed into 100 μm squares, and if the whole of the medium 52 is 32 mm squares, then thirty-two (32) pieces of the frames of 100 μm×100 μm squares are built up into the XY directions. With this, the total number of the assembly of the frames 33, on which the probes 5 are built up, comes to 32×32=1,024 pieces. Accordingly, the total number of the probes 5, which are provided in the whole of the medium also comes to 1,024 pieces. Provision of a large number of probes 5 in this manner enables to increase a number of data, greatly, which can be processed by one time.

Figure 5:
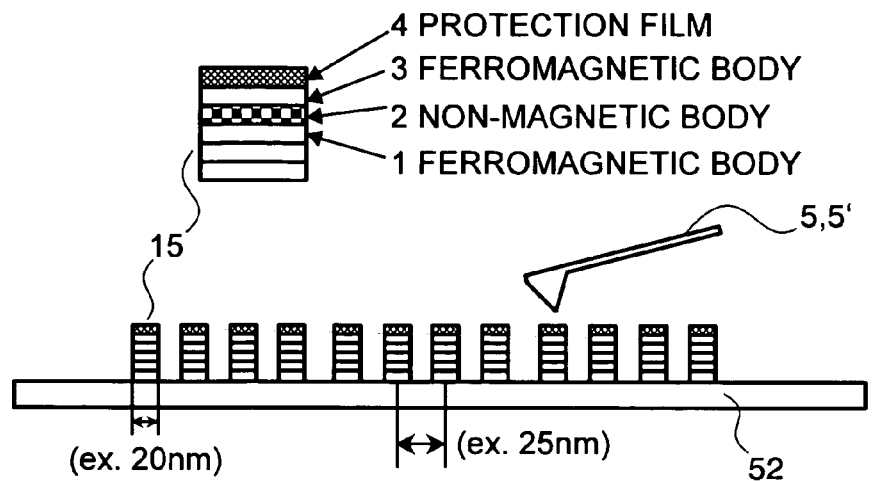
FIG. 5 is an explanatory view of the recording/reproducing apparatus, according to the present invention.

Next, an embodiment of the recording medium 52 shown in FIGS. 2 and 3 will be mentioned. FIG. 5 shows an enlarged side view of the probe 5 or 5' and the recording medium 52. The recording medium 52 is formed into a column-like shape, in the present embodiment, and below a protection film 4 are formed recording dots 15, each being called by a "ferromagnetic body 3/non-magnetic body 2/ferromagnetic body 1 pillar", and with respect to each of the recording dots 15, the probe 5 makes R/W by applying voltage or (tunnel) current, etc., by means of the voltage applying (R/W) circuit 43 in a manner of contacting thereon, or may be made in anon-contacting manner thereof, but floating on it by a microscopic amount of several nm.

Also, each the recording dot 15, in the structure thereof, is electrically insulated from one another, completely. Although there may be disposed a space between each of the dots 15, as is shown in FIG. 5, but the similar effect can be obtained by building up an insulating material in that gap portion. With such the structure, there is no electrical interference between each of the recording dots 15, thereby obtaining an advantage that the distance can be made very small (for example, 5 nm or less than that) between the dots, comparing to that of a thermal recording method, etc., and since the recording dots 15 can be disposed at high density, thereby enabling an increase of the recording capacity.

However, the recording medium in the present invention should not be limited, in particular, to the mentioned above, but also a contact film or a film for use of thermal recording, having the similar structure, may be applicable.

In the structure of the recording/reproducing apparatus shown in the above, up to now, each the probe 5 is provided in a single number thereof for each the frame 33, corresponding to each the area in charge, wherein each of the frames 33 for supporting the probes 5 or each of the media moves into the XY directions, so that a tip of the probe 5 can be positioned at a desired position. However, since the probe 5 moves into the XY directions within the very stall distance of several nm in height or under the contacting condition therewith, then a possibility is high that the tip of the probe collides on the medium to be broken, or worn away; i.e., there is a fear that R/W cannot be made.

Also, even if not being broken or damaged, but still there is a case that contaminating wastes, such as, dusts adhere at the tip, and so on, and in such the case, it is also considered that R/W cannot be made.

Further in the manufacturing of the probe 5, in particular in case when R/W is achieved while conducting an operation, such as, of supplying current through forming a conductive thin-film at the tip, etc., there is a possibility that R/W cannot be made at 100% irrespective of the fact that a probe is new, due to a problem in the film-forming method, etc.

In case when such various problems occur, so that the probe 5 cannot made R/W, and if the probe 5 is a single number thereof, which is formed for each the frame 33, in particular, when the moving area of the frame assembly 33' is limited within the frame 33, then data of the recording area at that portion cannot be used; thereby bringing about reduction of the recording capacity for a user. As a countermeasure for such the condition, a method is disclosed that a probe unit or an entire of the media is exchanged or replaced, as is described in the Patent Document 2, for example; however, since the present recording/reproducing apparatus is targeting also a mobile market, it is still difficult to apply the above, i.e., exchanging it actually, from a viewpoint of costs, as well as, by taking the technical adjustments or the line into the consideration.

An object of the present invention, for dissolving such the drawbacks mentioned above, is to provide a method for improving reliability of the apparatus, with a method being simple in the technology and cheap in the costs.

Figure 6:
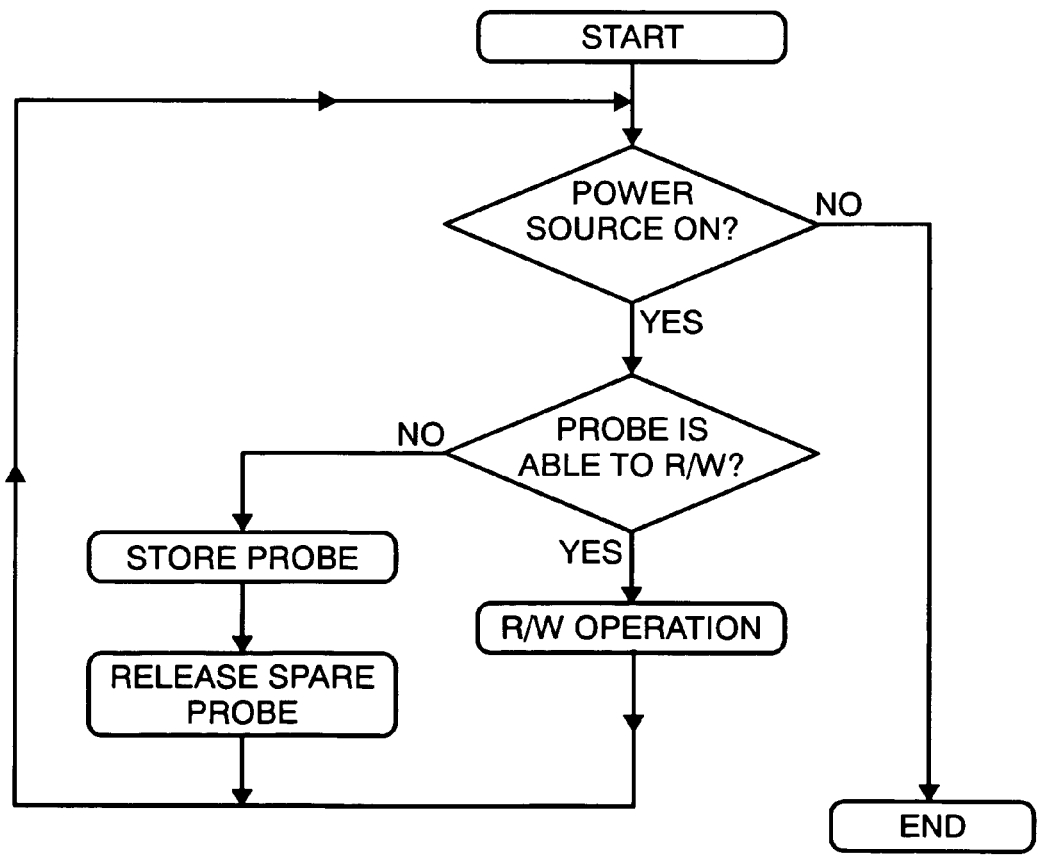
FIG. 6 is an explanatory view for explaining an algorithm of a controlling method, according to the present invention.

Next, FIG. 6 shows a flowchart for showing an exchanging operation of the probes 5 or 5'. First of all, when an electric power source is turned on, then only one (1) piece of the plural numbers of probes 5 or 5' within each of the frames 33 is in the condition of enabling R/W, while other probes are kept within the frames 33, electrically or mechanically. As a keeping method, for example, through applying a very small electric field on a stylus portion 10 of the probe, which is made of a metal, for example; thereby controlling the storing and keeping thereof, electrically. Or, on the contrary to this, it is also possible to achieve such a control that the probe is released when applying the electric field thereon. In that instance, the stylus portion 10 may be constructed being bent downwards through application of the electric field under the condition of being kept in an above. This electric force or the like can be calculated out upon basis of a mass of the beam and a spring constant thereof, etc., and is very small; therefore, it is possible to determine it, but without giving ill influences upon other portions.

Also, as other method thereof, a piezoelectric element (PZT) is formed above the stylus portion 10 of the probe, so as to control the storing and releasing thereof with using thereof. Or, there can be also considered a method of forming a fine or minute heater or the like above the stylus portion of the probe, which thermally expands; thereby controlling the storing and releasing thereof through heating it.

Next, supplying current into the probe enabling R/W, it is checked to be able to R/W or not. In case of being able to R/W, then it conducts a following operation as it is, and when R/W signal is inputted, then the probe 5 or 5' is positioned at a predetermined position, through movement of either the medium 52 or the probe 5 or 5', to conduct the R/W operation. In case of being unable to R/W, first the probe 5 or 5' being unable to R/W is stored or kept into the frame 33 through the electrical operation or the mechanical operation, which was mentioned above. Next, a spare probe 5' stored within the same frame 33 is released, electrically or mechanically, as well as, achieving exchange of switches of the R/W circuit 43; thereby retuning or restoring it into the condition of enabling R/W.

Next, an operation check is conducted upon the probe 5' through supplying current therein, and thereby determining on whether it is able to R/W or not. If being able to R/W, the R/W operation is continued with using that probe 5'. If being unable to R/W, checking is made upon other spare probe 5' within the same frame, in the similar manner, on whether it is able to R/W, and if being able, the operation is continued.

In this manner, with storing and holding the probes in plural numbers thereof within the same frame 33, it is possible to use other spare probe 5', soon, even in case when the probe comes to be unable to R/W due to external and internal factors, and therefore the apparatus can be prevented from lowering the memory capacity thereof, as well as, obtaining a long lifetime thereof and also increasing the reliability thereof.

Figure 7:
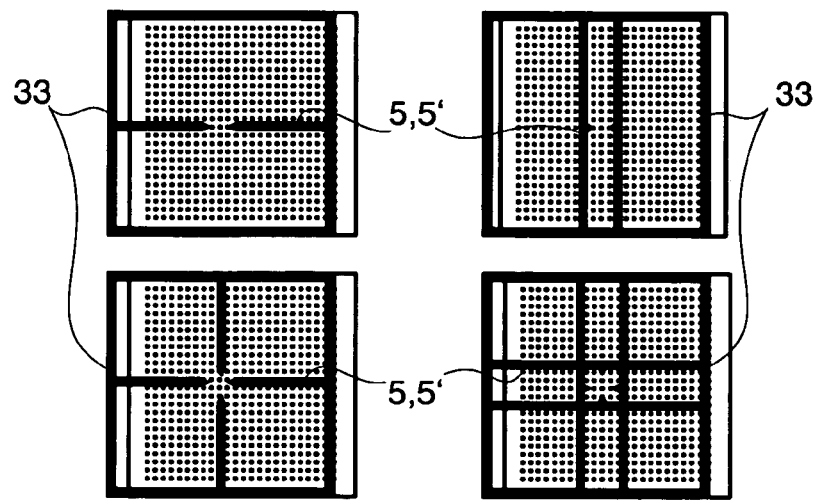
FIG. 7 is an explanatory view for explaining a tip position of a spare probe, according to the present invention.
Figure 8A:
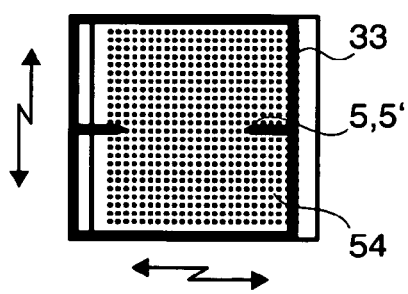
FIG. 8 is an explanatory view for explaining the probe, according to the present invention.

Further, if conducting the exchange of an initial probe 5 to the spare probe 5' upon conducting such the operation as was mentioned above, since correlation differs between position information of the said recording dot 15 on the medium 52 and R/W data on that probe 5; therefore, there is caused a necessity of conducting rewiring of the R/W data on the spare probe 5'. For this reason, within an inside of the scanner controller 44, there is provided a memory element (i.e., a memory) 55, into which offset values ($\Delta x$, $\Delta y$) are stored in advance, of the position information when changing from the probe 5 to the spare probe 5', and at the time point when exchange is made from the probe 5 to the spare probe 5', the position information of the probe to the medium is added at a ratio of the offset values ($\Delta x$, $\Delta y$). Thereafter, each the R/W data is written into the memory 55, sequentially, by means of the spare probe 5', to be stored temporarily therein, and further, it is written into each recording dot 15, again, so that it corresponds to the position ($X+\Delta x$, $Y+\Delta y$) of the spare probe 5'. With this, it is possible to read the data by the spare probe 5', being same to that read by the initial probe 5, even when the probe is exchanged from the initial probe 5 to the spare probe 5', and also under the same operation when the entire of the frame moves sequentially into the XY directions. For the purpose of enabling such the operation, the offset values ($\Delta x$, $\Delta y$) comes to be small if the tip portions of the probe 5 and the spare probe 5', which conduct the R/W, are close to each other, as is shown in FIG. 7; therefore, it is more preferable to build up the respective probes to be close at the tips thereof. Also, adopting such the structure of closing them in the vicinity of a central portion, in such the manner, enables to make a movement stroke of the frame small. FIG. 8 shows an example of this.

In FIG. 8, consideration is made on a case where (a) the probe length=25 um and (b) probe length=45 um, for example. In the case of (a) the probe length=25 um, moving distance in the X direction is (−25 to 75 um) for reading all of the data within the recording area 54, however in the case of (b) probe length=45 um, it is (−45 to 55 um); i.e., it is sufficient to make the symmetrical movement, nearly, on both directions, with respect to a standard position under an initial condition. Also, the distance of stroke can be made small, and then also the load on the mechanism for driving thereof comes to be small because of the short distance; thereby brining about a merit of enabling to conduct the accurate positioning, easily, etc.

As will be mentioned later, the distance of stroke can be made small also when conducting R/W of the data within other recording area 54 by the probes 5 and 5' of the neighboring frames, and therefore it is possible to keep the sizes of the apparatus as a whole small.

Figure 8B:
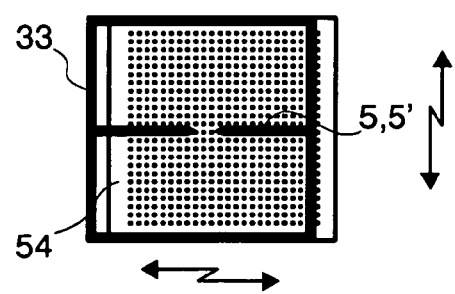

When trying to R/W of the data in the neighboring recording area 54, for example, under the condition of (a) the probe length=25 um shown in FIG. 8 mentioned above, the moving distance is (−25 to 175 um), and under the condition of (b) the probe length=45 um, the moving distance is (−45 to 155 um); i.e., that under the condition (a) is larger than, by 20 μm in the + direction, and it also needs the moving time much more for that distance. Also when driving it in the XY directions, due to the fact that the moving stroke becomes large, the stiffness or rigidity on the side of the frame 33 or the stage 45 comes down, accompanying with a large degree of freedom taken at the support portion; therefore, there is brought about problems, such as, the responsibility is deteriorated, for example, to the signals into the XY directions. From such various reasons, as were mentioned above, it is preferable the probes 5 and 5' are close to each other, in particular, in the distance between the tips thereof, as is shown in FIG. 8(b).

Explanation will be given about storing and releasing operations of the probes 5 and 5', in more details, by referring to FIG. 9.

Figure 9A:
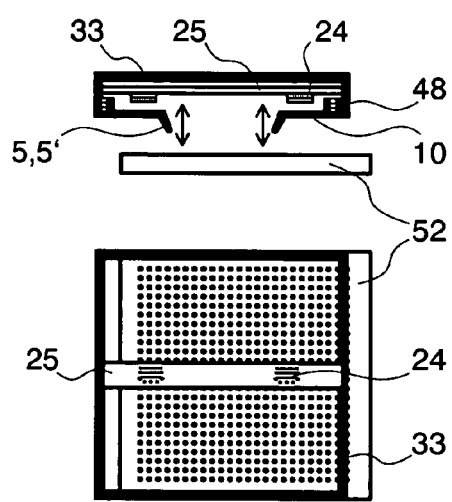
FIG. 9 is an explanatory view for explaining a method for storing and/or controlling of the probe, according to the present invention.
Figure 9B:
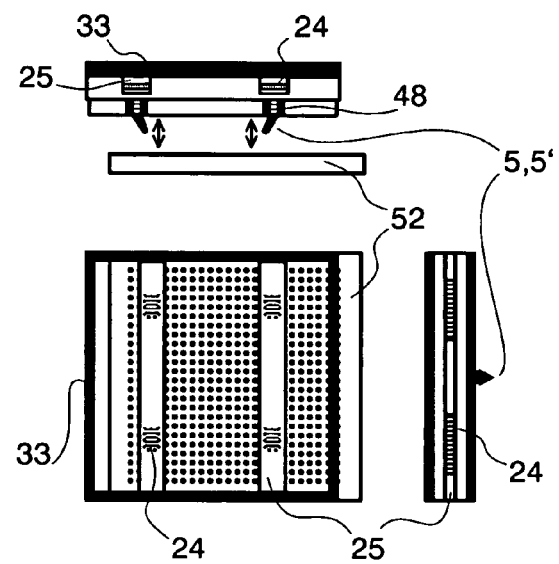

First, with the method for storing electrically, both beam portions 10 of the cantilever-type probes 5 and 5' shown in FIG. 9(a) and also the double-sided beam-type probes 5 and 5' shown in FIG. 9(b) are made of Si (silicon), in general. On the surfaces of those beam portions 10 are formed metal thin-films, through spattering and/or deposition, etc. On the other hand, within the frame 33, a board 25 is formed above the probe 5 and 5', and on those boards 25 are manufactured very fine or minute coils 24, above the beam portion 10 of the probes 5 and 5', which are formed through MEMS (Micro Electro Mechanical System), etc., wherein current is conducted through the coils, so as to suck or absorb the beam portions 10 into the direction of the frame 33, thereby achieving the operation of storing the beam portion 10 upwards, or releasing it downwards, etc. In case when releasing the beam portion 10 downwards through conducting current through the coil, if providing a bending or deflection upwards on the beam portion 10 in advance, then it is possible to obtain the structure that it bends downwards when conducting current through the coil.

Figure 10A:
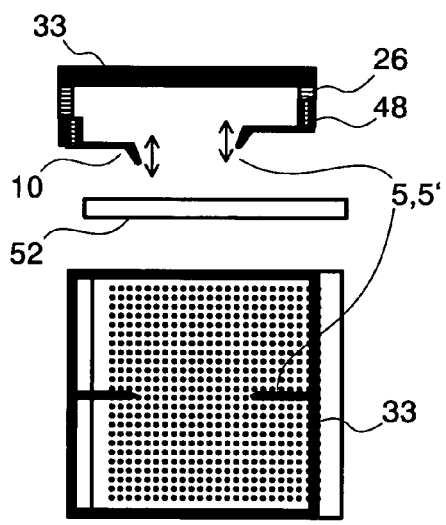
FIG. 10 is an explanatory view for explaining a method for storing and/or controlling of the probe, according to the present invention.
Figure 10B:
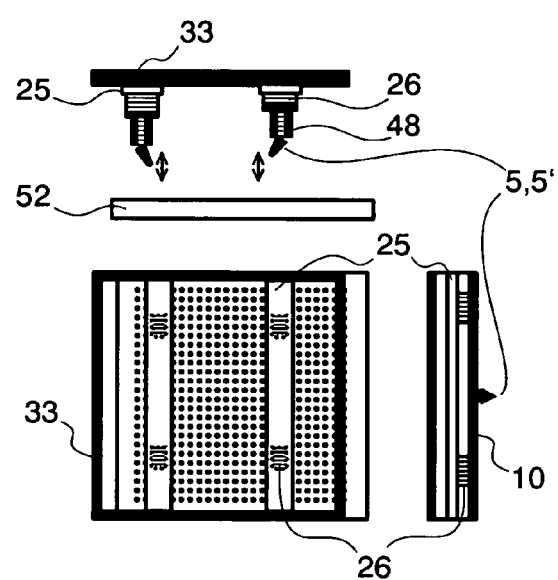

Next, with the method for storing or releasing mechanically, with using a PZT, firstly there can be considered a method of applying a PZT 26 for use of rough-adjustment and a PZT 48 for use of fine-adjustment, in combination thereof, as is shown in FIG. 10. In that instance, the PZT 26 for use of rough-adjustment, which is provided above the beam portion 10, expands and contract upon the electric signal; thereby, storing the probe 5 in the trouble upwards, while releasing the spare probe 5' downwards. Next, adjustment is made upon the distance between the probe 5' and the medium 52 by means of the PZT 48 for fine-adjustment in the Z direction. Of course, those two PZT 26 for use of rough-adjustment and PZT 48 for use of fine-adjustment mentioned above are not necessary of being provided, separately, and it is also possible to obtain the similar effect when building them up to a one PZT. Also, as other embodiment, it is not necessary to say, but the similar effect can be obtained by substituting the PZTs mentioned above, with heaters or the like, each of which expands due to heat when supplying an electric signal thereto.

Figure 11A:
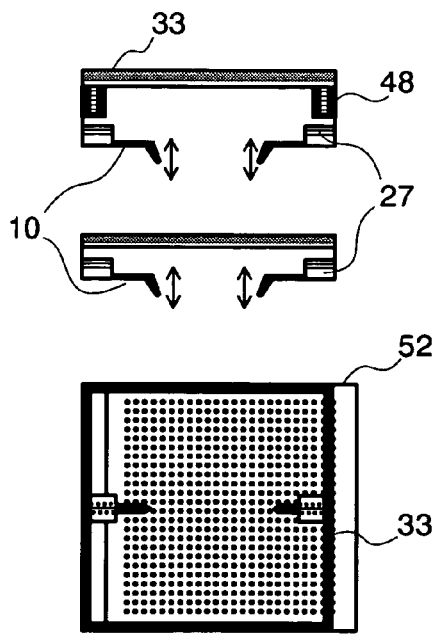
FIG. 11 is an explanatory view for explaining a method for storing and/or controlling of the probe, according to the present invention.
Figure 11B:
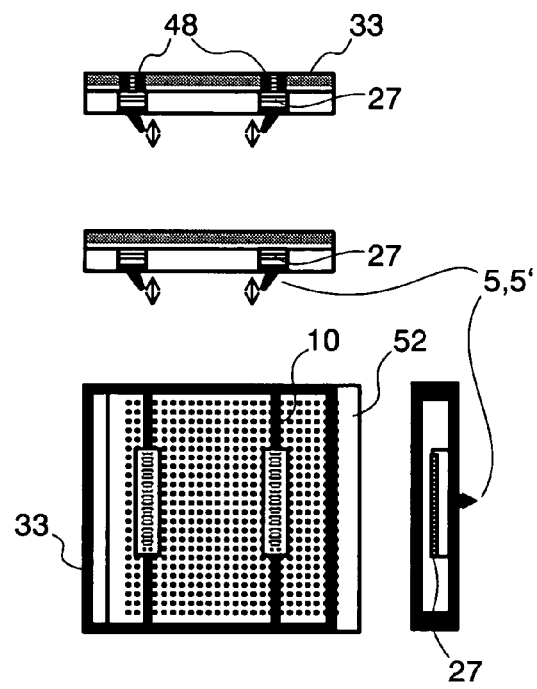

FIG. 11 shows a case where bimorph-type PZTs 27 substituting for the PZTs 26 mentioned are provided in an upper portion of the beams 10. The bimorph-type PZT 27 is a PZT of making vertical displacement as a whole through bending of an upper position or a lower portion of thereof, and as is apparent from FIGS. 11(a) and 11(b), with provision thereof (a) at the root or (b) in an upper potion of the beam portion 10, it is possible to control the height of the probes 5 and 5'. Also with the bimorph-type PZTs 27 mentioned above, it is possible to make the rough adjustment and the fine adjustment therewith, if applying them in combination with the PZTs 48. Further, as other embodiment, it is also possible to substitute the bimorph-type PZTs 27 by the heaters, which conduct the expansion and contraction operations in the similar manner.

It is preferable that the very fine or minute PZTs and/or coils or the like mentioned above be produced through the MEMS.

Figure 12:
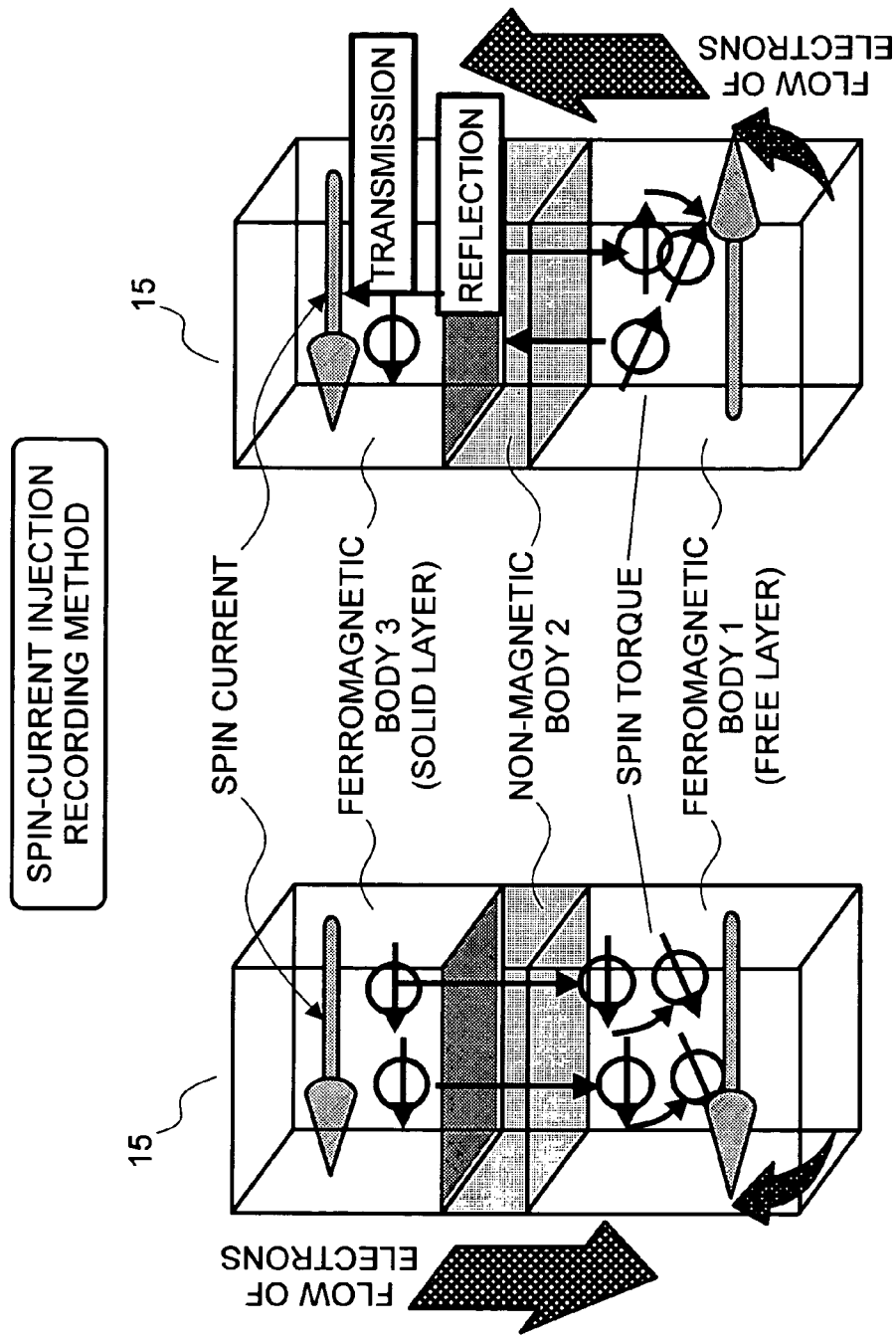
FIG. 12 is an explanatory view for explaining a R/W method, according to the present invention.

Next, description will be made about a method for determining on whether the probe is able to R/W or not. In checking on whether it is able to R/W or not, as is shown in FIG. 12, the probe 5 is stopped at an arbitrary recording dot 15, for example, thereby causing flux reversal of the recording dot 15 with conducting current therethrough. As a principle of that, within the recording dot 15 shown in FIG. 5, since electron spins are trying to turn the direction thereof into the direction of the magnetization of the film, due to the fact that spin current aligned in the directions thereof enters into a film of the other ferromagnetic body 1 through the non-magnetic body 2, therefore the force of changing the direction of that spin, i.e., spin torque, comes to be large in proportional to an amplitude of the current. When it exceeds a certain threshold value, the direction of magnetization is changed over. This is the principle of the recording. When reproducing, current is conducted in the similar manner, and information is reproduced from changes in the resistance with respect to the current, which is produced through the changes in magnetization. By conducting such confirmation with using the spin current upon an arbitrary recording dot 15, by means of each probe 5 when conducting non-R/W (i.e., when following), it is possible to check on whether the each probe 5 and the recording dot 15 are able to R/W or not, respectively.

Figure 13:
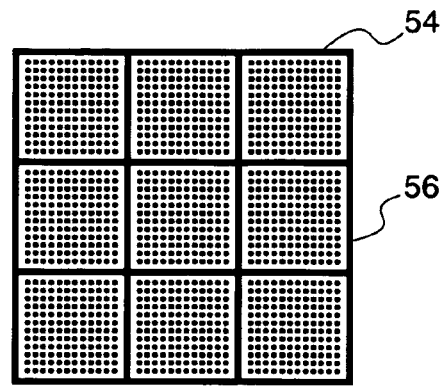
FIG. 13 is an explanatory view for explaining a conduction confirmed area, according to the present invention.

Also, as other embodiment, there can be considered a method of determining on whether the probe is abele to R/W or not, while providing a confirmation area 56, being made of a metal film, for use of conduction of current or R/W, around each of the recording areas 54, as shown in FIG. 13, and by moving the tip of the probe to that portion, so as to conduct current therethrough, when checking the probes 5 and 5'.

Figure 14:
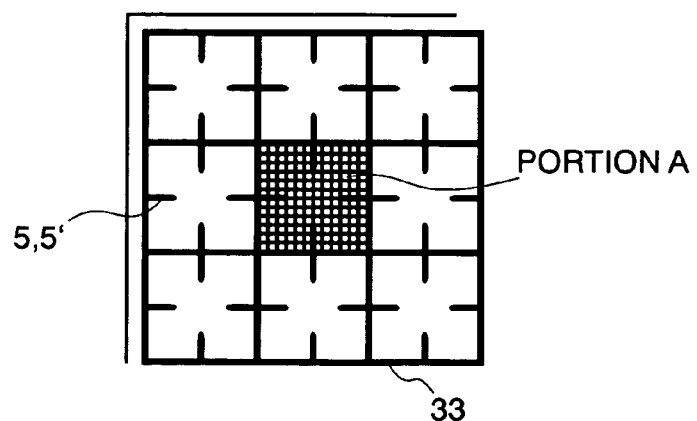
FIG. 14 is an explanatory view for explaining other embodiment, according to the present invention.

Next, as further other embodiment, there is considered that all of the probes 5 and 5' within a certain frame 33, including the spares thereof, are in the condition of being unable to R/W. In case when all of the probes 5' within each of the frames 33 shown in FIG. 1 are unable to R/W, and/or when the moving distance of the stage 45, which mounts the frame assembly 33' or the medium 52 thereon, is within the length of a one side of the each frame 33, the data within the recording area 54 in the region of A portion shown in FIG. 14 cannot be R/W since all of the probes 5 and 5' within the frame 33 are in trouble. For achieving R/W of the data in this region, it is necessary to locate the probes 5 and 5', which are within the neighboring frames, above the region of the A portion. For that purpose, the strokes for movement of the medium 52 or the frame assembly 33' are let to have enough spaces or margins, horizontally and vertically, i.e., making the region of ±50 μm long, for example, ±150 μm; thereby enabling R/W by means of the probes 5 and 5' within the frames 33 of the neighboring portions. However, for covering all of the regions with such the method as was mentioned above, it is necessary that any one of the probes 5 and 5' within the frames 33 of the neighboring portions, with certainty, but if all of the probes 5 and 5' within the frames 33 of the neighboring portions are unable to R/W, it is needed to conduct the R/W operation by means of the probes 5 and 5' within further neighboring frames 33. Accordingly, by taking such the cases into the consideration, i.e., by taking the margin to be two (2) times large, it may be thought that the stroke should be assumed, about ±300 μm horizontally and vertically, appropriately. Of course, the distance of the stroke, according to the present invention, should not be limited to that value, and it is preferable that the value is determined upon basis of the sizes of the frames and/or the structures of the apparatus as a whole, etc.

A method for conducting R/W is as follows, in particular, when all of the probes 5 and 5' within one of the frames 33 are in trouble, as was mentioned above. Assuming that the probes 5 are N pieces in total within N pieces of the frames 33, and that R/W is conducted by N bits, and if R/W cannot be made within one (1) pieces of the frame 33, then information of (N−1) bits can be made R/W by conducing the normal R/W operation at a time "t". The information of those (N−1) bits is memorized, once, into the R/W circuit 43. Thereafter, the medium 52 or the frames 33 move(s) by taking time Δt, and at the time t+Δt, R/W of the information of remaining one (1) bit is conducted by the neighboring probes 5 and 5'; therefore, that information is memorized into the R/W circuit 43. In this manner, R/W of all information of N bits is completed at the time t+Δt, and this time is very short; therefore, a user enable to conduct R/W, as usually, i.e., to write (Write) or read (Read) the data, but without concerning about the troubles of the probes 5 and 5' within an inside.

Also, checking may be made on side of the medium 52 when conducting the following, in parallel with checking on the probes 5. In the similar manner as was mentioned above, in case when writing (Write) information of N bits at a certain time "t", and when the information of one (1) bit cannot be written (Write) due to a defect of the medium 52, then the information of one (1) bit is moved to the medium after writing (Write) the information of (N−1) bits by means of the probes 5 within each of the frames 33, and it is written (Write) into other recording area at the time t+Δt. When reading (Read), as was mentioned above, the information of (N−1)

bits is readout (Read) at the time "t", and the remaining information of one (1) bit is read out (Read) at the time t+Δt; thereby enabling to read (Read) the all information of N bits.

With installing of such the control method as was mentioned above into the inside of the apparatus, in the form of algorithm, since the defect can be compensated, automatically, when that defect is generated within the probe or the medium 52, so that the user can continue R/W operation without concerning about that defect; therefore, it is possible to elongate the lifetime of the recording/reproducing apparatus as a whole, as well as, to improve the reliability as being of such the apparatus.

In the above, though assumption is made that the control method mentioned above would be installed when a user use it after shipment of that apparatus, however this control method can be applied in an inspection of the apparatus before the shipment thereof. On that instance, checks are made make on whether the probes 5 and 5' are able to R/W or not, with respect to the medium 52 for all of the probes 5 and 5', when the apparatus is installed, and then, if defect is detected, it is important to ship the product, after exchanging the probes 5 and 5' or the medium 52 detected by a new one, and confirming the condition thereof, being completely operable.

Further other embodiment, with provision of the memory within an inside of the scanner controller 44, as was mentioned above, it is also possible to provide an urgent data transfer mode within an inside in the form of algorithm, i.e., when all of the probes 5 and 5' in a certain area are broken, or when the recording area cannot be used, the data of that recording area 54 are re-writing onto other recording areas 54, sequentially, after storing them into the memory 55, once, and also when that recording area cannot be used, but without notice by the user of lowering in the recording capacity. When in that mode, the probes 5 and 5' of the neighboring recording areas 54 read the data into the memory 55, temporarily, to be stored therein, and the data are distributed, sequentially, into the other recording areas 54, thereby to be written into each of the recording areas 54 by means of the probes 5 and 5', which are provided in each of the frames 33.

In this manner, with provision of such the urgent data transfer mode as was mentioned above, it is possible to maintain the data and the apparatus, when the probes 5 and 5' of a certain recording area 54 cannot be used or when defect is generated in the recording area.

Figure 15:
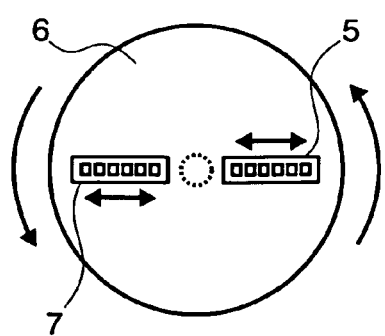
FIG. 15 is an explanatory view of a rotary-type recording apparatus, in relation to the conventional art.
Figure 16A:
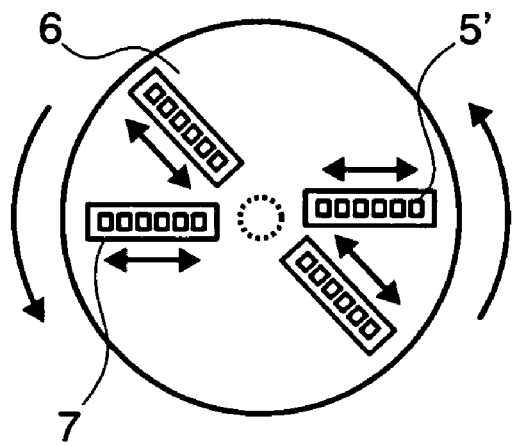
FIG. 16 is an explanatory view of a third embodiment, into which the present invention is applied into the rotary-type recording apparatus.
Figure 16B:
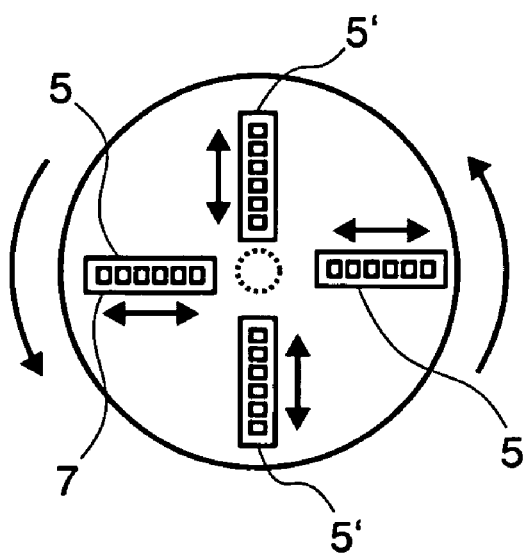
Figure 17A:
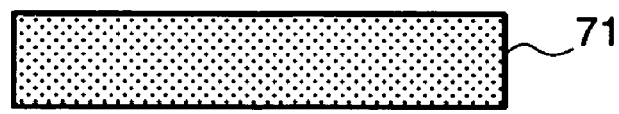
FIG. 17 is an explanatory view for showing a manufacturing method of the probe, according to the present invention.
Figure 17B:
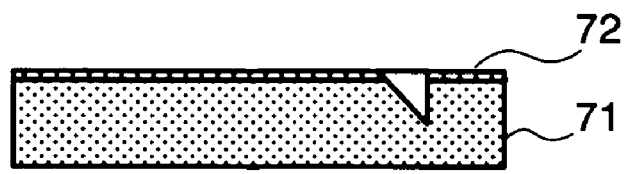
Figure 17C:
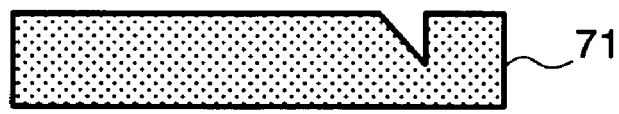
Figure 17D:
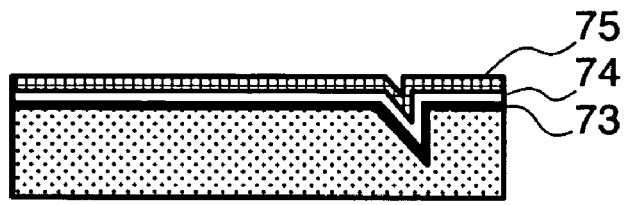
Figure 17E:
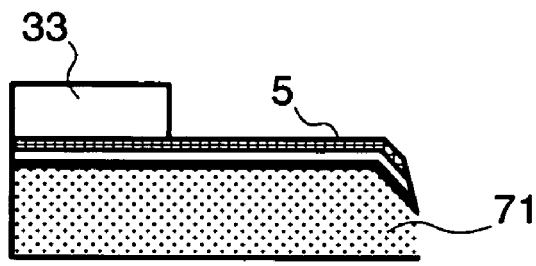
Figure 17F:
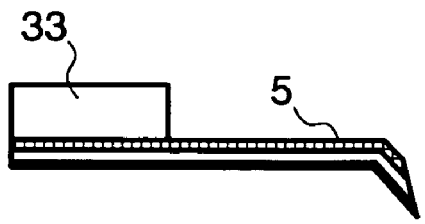

Next, description will be made about an embodiment of applying the present invention into a rotary-type recording/reproducing apparatus. FIG. 15 shows an example described in the Patent Document 3. Opposing to a rotary-type recording medium are aligned probes in the radial direction thereof, and opposing on the rotary-type recording medium is provided a one-body moving mechanism for making movement in the radial direction thereof. FIG. 16 shows an example of applying the spare probes 5', according to the present invention, into the recording/reproducing apparatus shown in FIG. 15, having the rotary-type recording medium 6 therein. The spare probes 5' may be provided behind, for each of the probes 5, separating from it by 45 degrees, for example, as shown in FIG. 16(a), or maybe disposed separating from it by 90 degrees, as is shown in FIG. 16(b). Each of the probes 5 shown in FIGS. 16(a) and 16(b) is checked during the time of following when no R/W is conducted, by means of the algorithm shown in 6, in the similar manger to that of the type of moving on a plane by means of the scanner shown in the above, and if the each probe is unable to R/W, it is replaced by the spare probes 5'. In this manner, with provision of the spare probes 5', in the similar manner to that of the type of moving on the plane, it is possible to compensate the defect, automatically, thereby obtaining a long life-time of the apparatus, as well as, the reliability as being of such the apparatus.

Next, a manufacturing method of the probes 5 and 5' will be shown in FIGS. 17(a) to 17(f). First of all, (1) a Si substrate 71 is prepared. (FIG. 17(a)) (2) On surface of the Si substrate is formed a $SiO_2$ film 72 through spattering, etc. (3) Next, an opening pattern of 4 μm squares is formed on the $SiO_2$ film 72 through photolithography and reactive ion etching. (FIG. 17(b)) (4) A hole is produced on the Si substrate 71, fitting to the tip shape of the probe, through anisotropic etching, etc., and then the $SiO_2$ film 72 is removed from, with using hydrogen fluoride or the like. (FIG. 17(c)) (5) After removal of the $SiO_2$ film 72, a lower metal layer 73, a probe layer 74 of silicon nitride, etc., and an upper metal layer 75 are formed, sequentially, on the Si substrate, in the form of a film, through the CVD method or spatter evaporation, etc. Also, when an adhesive layer is necessary to be formed between the respective layers, the adhesive layer may be formed, appropriately. Further, in case of forming a protection film of abrasive-resistance characteristic on the surface thereof, a DLC film or the like may be formed through the Cathodic Arc method, etc. As a material of the metal layers 73 and 75, there can be considered titanium, tungsten, chromium, and carbide or nitride thereof. Those metal layers and the adhesive layers are formed in the form of a film, each being equal or less than 50 nm in the film-thickness thereof. Also, the probe layer 74 is determined, appropriately, on both the material and the film-thickness (approximately, from 0.5 to several μms), so that it has a desired spring constant. (FIG. 17(d)) (6) Next, the configuration of the probe 5 is manufactured through the photolithography and the reactive ion etching, etc. (FIG. 17(e)) (7) Then, the probe manufactured in this manner is attached or adhered onto each of the frames 33 mentioned previously. In case when attaching the probes onto the each frame 33 in plural numbers thereof, the adhesion may be conducted, one by one. (8) Finally, dissolving the Si substrate 71 by an aqueous solution of potassium hydrate completes the probe (FIG. 17(f)).

Figure 18:
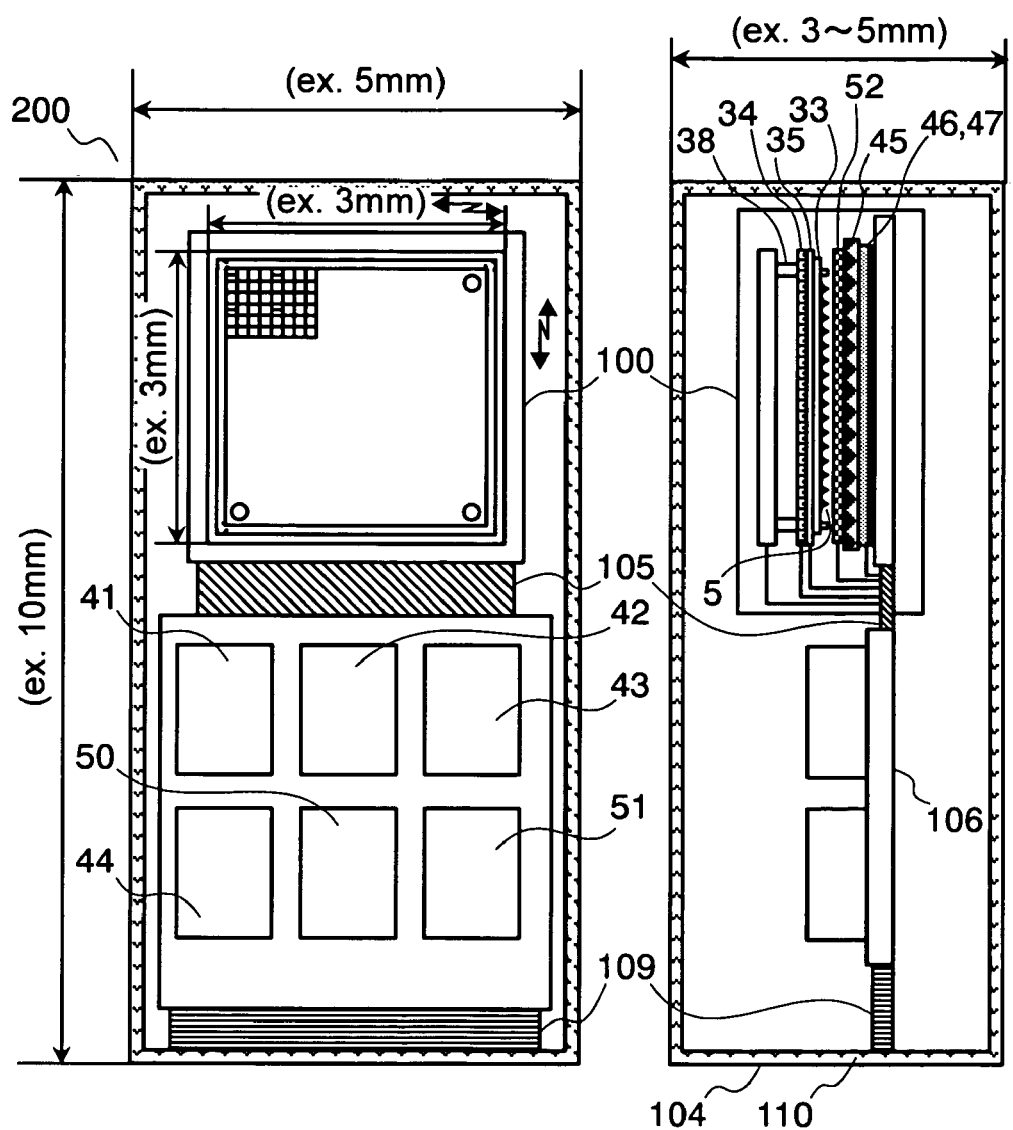
FIG. 18 is an explanatory view for showing the structure of the recording/reproducing apparatus, according to the present invention.

At the end, an example of the recording/reproducing apparatus 200 is shown in FIG. 18, applying the recording method 1 according to the present invention therein. In FIG. 18, within the recording/reproducing apparatus 200, it is constructed with a recording/reproducing unit 100, which is provided with the probes 5 and 5' therein, a circuit board 106, on which is provided a one (1) set of controller circuits, a bus portion 109, functioning as an interface between the recording/reproducing apparatus 200 and a computer (not shown in the figures), and a housing 104, within which a damper material is 110 provided in the form of a protection layer, for the purpose of protecting the entire body from shocks and/or vibrations. The one (1) set of controller circuits mentioned above is built up with, such as, the parallelization-degree detector circuit 50 and the electric power-supply circuit 51, etc., in addition to the signal processor circuit 41, the PZT controller 42, the voltage applying circuit (i.e., the R/W circuit) mentioned previously, for example. Explanation will be given about the details thereof, hereinafter.

As was mentioned above, the recording/reproducing unit 100 is supported by an upper portion of the frames 33, supporting the probes 5 and 5', and also the frame assembly 33', and in an upper portion of that frame assembly 33' is formed a wiring structure portion 35, wherein the frame assembly 33' and the wiring structure portion 35 are supported by the frame supporting portion 34. On the other hand, the medium 52 is fixed on the stage 45, and that stage 45 has such the structure that it can move into the XY directions by means of the XY scanner 46 provided in the lower position thereof, and also vertically, by means of the Z-axis scanner 47. In the present embodiment, each the frames 33, on which the probe 5 is formed, has an area of 100 μm squares, and they are provided in total 32×32=1,024 pieces, aligning 32 pieces thereof horizontally and also 32 pieces vertically. Accordingly, the frame assembly 33' has an area, about 3.2×32 mm squares, and the recording/reproducing unit 100 is manufactured to be 4×4 mm in the sizes thereof, for example.

Also, PZTs 38 are provided on every (four (4)) corners in the upper portion of the frame supporting portion 34, which supports the probes 5, thereby having the structure of controlling the frame assembly 33' to be parallel to the medium 52. For the purpose of keeping the degree of parallelization between the frame assembly 33' and the medium 52, sensors 39 are provided on every corners of the frame assembly 33', so as to check the degree of parallelization between the frame assembly 33' and the medium 52, always; i.e., a signal is outputted to the PZTs 38 in the upper portion of the frame with an aid of the PZT controller 42, so that the degree of parallelization comes to be equal or less than a certain constant value.

The recording/reproducing unit 100 mentioned above is connected with the substrate 106, on which the one (1) set of controller circuits are mounted, through a connector portion 105, and therefore it communicates signals between each of the controller circuits. As such the controller circuits, there are provided the signal processor circuit 41, the PZT controller 42 for driving/controlling the PZTs 39, the voltage applying (R/W) circuit 43 for conducting recording/reproducing of information, the scanner controller (i.e., the positioning driver control circuit) 44 and the build-in memory 55 (not shown in the figures), the parallelization-degree detector circuit 50 for detecting parallelization-degree signals from the sensors 39 mentioned above, and the electric power-supply circuit 51 for supplying the electric power to the recording/reproducing unit 100 and the controller circuits, etc.

Since each of the circuits is integrated, they are built into a very small chin. Also, the circuit board 106 mentioned above is connected to the bus portion 109, which functions as an interface between the computer (not shown in the figures) and so on; therefore, it has the structure of the recording/reproducing apparatus 200, being detachable and/or portable. Since the recording/reproducing apparatus 200 is protected by means of the dumper material 110, therefore it has the structure of being protected from the shocks and/or vibrations. Also, for protecting the data when it is carried, there is provided a safety apparatus (not shown in the figures), such as, one for fixing the frame assembly 33', etc. In the present embodiment, the sizes of the recording/reproducing apparatus 200, including the recording/reproducing unit 100 and the one (1) set of controller circuits therein, are about 5×10 mm, for example. Of course, the recording/reproducing apparatus 200 applying the present invention therein should not be limited to that size only.

Although the explanation was given on the recording/reproducing unit 100 of the stage-type, in the above, however in case that it is of the rotary-type, the rotary-type recording medium 6 mentioned above is rotated by a spindle motor, thereby to conduct R/W through the probes 5 and 5' mentioned above, in the method thereof; however, other than those, i.e., the operations of R/W and signal processing, etc., may be conducted in the similar manner to the above.

As was fully mentioned in the above, the recording/reproducing apparatus 200 according to the present invention, in spite of the size of about 5×10 mm, as a whole thereof, enables to achieve; a large memory capacity, compactness, and high speed of data transfer. And, if installing the present recording/reproducing apparatuses in plural numbers thereof, it is possible to provide a recording/reproducing apparatus, enabling to have a further large capacity.

The present invention is applicable into the recording/reproducing apparatus, for use in the computer, etc.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A recording/reproducing apparatus, comprising:
a recording medium; and
a large number of probes, each having a stylus-type arm, at a tip of which a chip is formed, whereby recording/reproducing information into a recording/reproducing area of said recording medium with respect to each of said probes, through conducting recording/reproducing in parallel processing, wherein said recording medium is a rotary-type recording medium, each of said probes is supported by a moving mechanism, being provided opposing to said recording medium, and plural numbers of moving mechanisms for spares are provided, each being provided with the large number of the probes within a same plane of said moving mechanisms.

2. A recording/reproducing apparatus, as comprising:
a recording medium;
a recording/reproducing unit comprising a large number of scanner-type probes for recording and/or reproducing information onto/from said recording medium, wherein the large number of said probes are so disposed, that a plural number of said probes are able to make recording or reproducing onto a same recording area on said recording medium, which is in charge of said probes, respectively;
a frame assembly, constructed with a number of frames, each having the plural number of said probes;
a frame supporting portion for supporting said frame assembly;
a XYZ scanner for positioning said recording medium;
sensors for detecting a degree of parallelization between said frame assembly and the recording medium;
PZTs for adjusting the degree of parallelization; and
a set of controller circuits for controlling said recording/reproducing unit.

3. A recording/reproducing apparatus, as comprising:
a recording medium;
a recording/reproducing unit comprising a large number of probes, each having a stylus-type arm, at a tip of which a chip is formed, whereby recording/reproducing information into a recording/reproducing area of said recording medium with respect to each of said probes, through conducting recording/reproducing in parallel processing, wherein each of said probes is supported by a moving mechanism, being provided opposing to said recording medium, and plural numbers of moving mechanisms for spares are provided, each being provided with the large number of the probes within a same plane of said moving mechanisms;
a frame assembly, constructed with a number of frames, each having a plural number of said probes;
a frame supporting portion for supporting said frame assembly;

a XYZ scanner for positioning said recording medium;
sensors for detecting a degree of parallelization between said frame assembly and the recording medium;
PZTs for adjusting the degree of parallelization; and
a set of controller circuits for controlling said recording/reproducing unit.

* * * * *